(12) United States Patent
Amano et al.

(10) Patent No.: US 10,001,915 B2
(45) Date of Patent: Jun. 19, 2018

(54) METHODS AND DEVICES FOR OBJECT SELECTION IN A COMPUTER

(71) Applicant: International Business Machines Corporation, Armonk, NY (US)

(72) Inventors: Takehiko Amano, Tokyo (JP); Kenya Ishimoto, Tokyo (JP); Harumi Itoh, Chiba (JP); Daisuke Maruyama, Tokyo (JP); Atsushi Yokoi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1191 days.

(21) Appl. No.: 14/107,063

(22) Filed: Dec. 16, 2013

(65) Prior Publication Data

US 2014/0181757 A1 Jun. 26, 2014

(30) Foreign Application Priority Data

Dec. 20, 2012 (JP) ................................. 2012-278041

(51) Int. Cl.
*G06F 3/0481* (2013.01)
*G06F 3/0488* (2013.01)
*G06F 3/0484* (2013.01)

(52) U.S. Cl.
CPC .......... *G06F 3/0488* (2013.01); *G06F 3/0484* (2013.01); *G06F 3/04842* (2013.01)

(58) Field of Classification Search
CPC .. G06F 3/04812; G06F 3/0488; G06F 3/0416; G06F 3/04842; G06F 3/0482; G06F 3/04817; G06F 21/36
See application file for complete search history.

(56) References Cited

U.S. PATENT DOCUMENTS 7,561,145 B2 * 7/2009 Garside ............... G06F 3/03545
                                                    345/173
7,925,996 B2 * 4/2011 Hofmeister ........... G06F 3/0488
                                                    715/701

(Continued)

FOREIGN PATENT DOCUMENTS

CN 102147700 A 8/2011
CN 102336525 A 2/2012

(Continued)

OTHER PUBLICATIONS

I. Scott MacKenzie and Aleks Oniszczak. 1998. A comparison of three selection techniques for touchpads. In Proceedings of the SIGCHI Conference on Human Factors in Computing Systems (CHI '98), Clare-Marie Karat, Arnold Lund, Joëlle Coutaz, and John Karat (Eds.). ACM Press/Addison-Wesley Publishing Co., New York, NY, USA, 336-343. DOI=http://dx.doi.*

*Primary Examiner* — Phuong H Nguyen
(74) *Attorney, Agent, or Firm* — Jared C. Chaney

(57) ABSTRACT

Embodiments relate to selecting an object displayed on a display device of a computer. Aspects include moving a movable pointer in the display device in response to a user input, determining whether the pointer is in a predetermined temporary selection state, and based on a determination that the pointer is in the temporary selection state, acquiring an object pointed to by the pointer and storing the object in the storage device as a temporarily selected object. Aspects further include acquiring an second object pointed by the pointer in response to the user performing a predetermined object selection operation, comparing the second object with the temporarily selected object, and based on a determination that the second object is identical to the temporarily selected object, determining that the second object is selected.

17 Claims, 9 Drawing Sheets

(56) References Cited

U.S. PATENT DOCUMENTS

| | | | | |
|---|---|---|---|---|
| 9,075,514 B1* | 7/2015 | Karakotsios | ........ | G06F 3/04842 |
| 2004/0204128 A1* | 10/2004 | Zakharia | ............. | G06F 3/04812 |
| | | | | 455/566 |
| 2005/0057498 A1* | 3/2005 | Gentle | ................ | G06F 3/04812 |
| | | | | 345/157 |
| 2010/0060595 A1 | 3/2010 | Lee et al. | | |
| 2010/0199179 A1* | 8/2010 | Suzuki et al. | ........ | G06F 3/0488 |
| | | | | 715/702 |
| 2012/0050211 A1* | 3/2012 | King | .................... | G06F 3/0416 |
| | | | | 345/174 |

FOREIGN PATENT DOCUMENTS

| | | | |
|---|---|---|---|
| CN | 102385473 A | | 3/2012 |
| CN | 102566920 A | | 7/2012 |
| JP | 08272526 A | | 10/1996 |
| JP | 09062446 A | | 3/1997 |
| JP | 2004086790 A | | 3/2004 |
| JP | 2006244393 A | | 9/2006 |
| JP | 2009062446 A1 | | 3/2009 |
| JP | 2009153072 A | | 7/2009 |
| JP | 2010211697 A | | 9/2010 |
| JP | 2011175613 A | * | 9/2011 |
| JP | 2012008923 A | | 1/2012 |
| WO | 2009008161 A1 | | 1/2009 |
| WO | 2012023346 A1 | | 2/2012 |
| WO | 2012124279 | * | 9/2012 |

\* cited by examiner

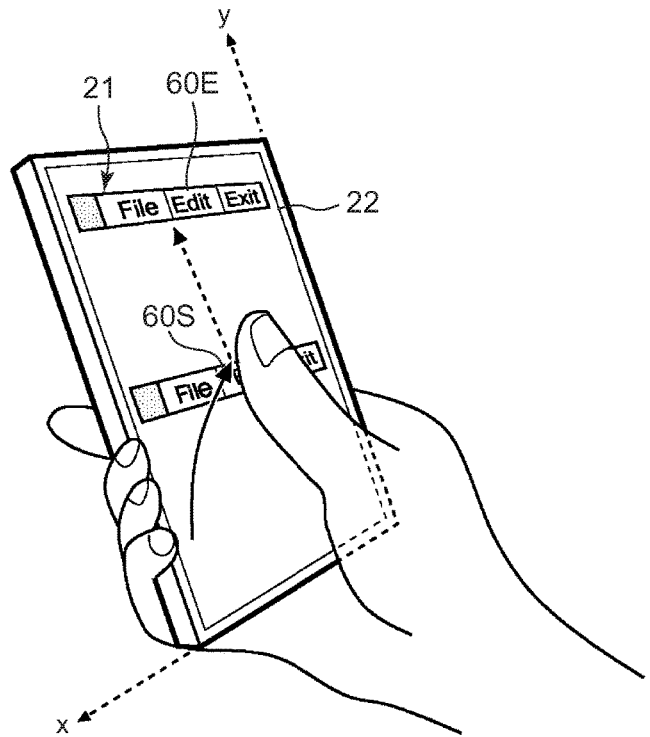

FIG. 6

DETERMINATION METHOD OF TEMPORARY SELECTION AND SELECTION

| | TEMPORARY SELECTION (STORAGE OF OBJECT) | SELECTION (CONFIRMATION) |
|---|---|---|
| MOUSE | MOVING SPEED OF POINTER IS NOT MORE THAN PREDETERMINED SPEED | LEFT BUTTON OF MOUSE DECISION KEY OF KEYBOARD |
| CAPACITIVE SENSING TOUCH PANEL | FINGER (STYLUS) STOPS WITHOUT TOUCHING SCREEN OVER PREDETERMINED PERIOD OF TIME | FINGER (STYLUS) IS REMOVED FROM SCREEN/ FINGER (STYLUS) TOUCHES SCREEN |
| OTHER TOUCH PANEL | THE SAME POSITION IS TOUCHED FOR PREDETERMINED PERIOD OF TIME/BEFORE UNIT OF TIME FOR CONFIRMATION | FINGER IS REMOVED FROM SCREEN |

FIG. 7

METHODS AND DEVICES FOR OBJECT SELECTION IN A COMPUTER

CROSS REFERENCE TO RELATED APPLICATIONS

This application claims priority to JP Application No. 2012-278041, filed Dec. 20, 2012, and all the benefits accruing therefrom under 35 U.S.C. § 119, the contents of which in its entirety are herein incorporated by reference.

BACKGROUND

Embodiments of the invention relate generally to selecting an object appropriately, and particularly to an object selection device, an object selection method and an object selection program each of which prevents a user from selecting an object improperly.

As a typical example of selecting an object on a computer, there is such a case where a pointer is moved to an object displayed on a screen of a display device and a selection operation such as clicking or the like is performed on the object. The movement of the pointer to the object is performed by use of a pointing device such as a mouse or a cursor key of a keyboard.

However, due to a combination of the movement of the pointer with the selection operation, an unintended object for a user may be selected. If a wrong object is selected, a function assigned to the object works, thereby resulting in that unnecessary troubles of finishing the function or of performing an UNDO operation are required.

BRIEF SUMMARY

Embodiments include a method, system, and computer program product for selecting an object displayed on a display device of a computer. Aspects include moving a movable pointer in the display device in response to a user input, determining whether the pointer is in a predetermined temporary selection state, and based on a determination that the pointer is in the temporary selection state, acquiring an object pointed to by the pointer and storing the object in the storage device as a temporarily selected object. Aspects further include acquiring an second object pointed by the pointer in response to the user performing a predetermined object selection operation, comparing the second object with the temporarily selected object, and based on a determination that the second object is identical to the temporarily selected object, determining that the second object is selected.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings.

FIG. 6 is another example of an object selection on a touch panel according to an exemplary embodiment.

FIG. 7 is a table illustrating a determination method of a temporary selection and a selection according to an exemplary embodiment.

DETAILED DESCRIPTION

Figure 1:
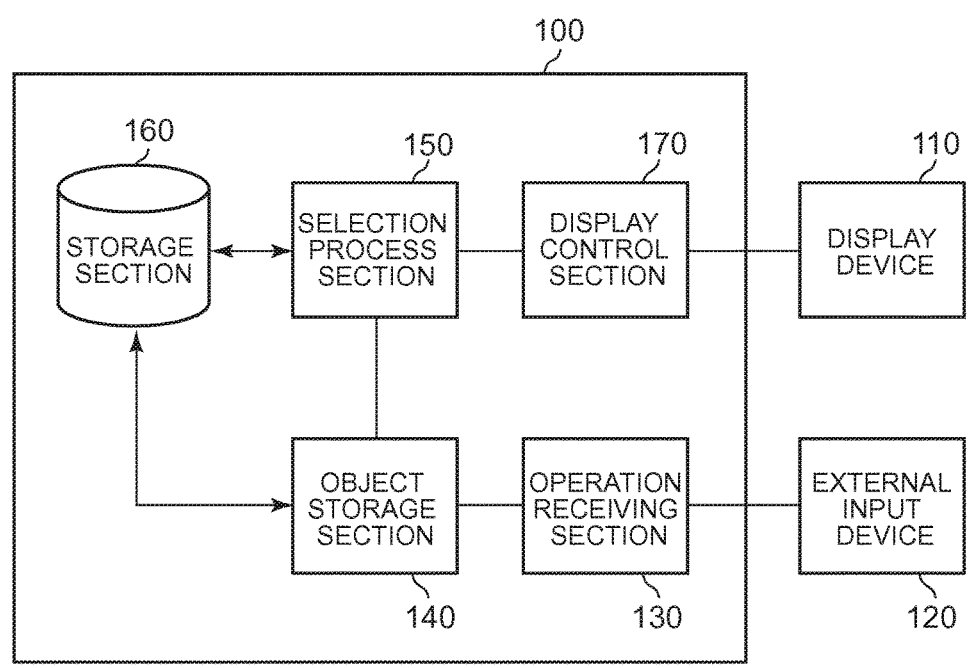
FIG. 1 is an exemplary function configuration of a selection system to which an exemplary embodiment is applied.

FIG. 1 is a view illustrating an exemplary function configuration of a selection system to which an exemplary embodiment is applied.

As illustrated in FIG. 1, a selection system 100 according to an exemplary embodiment includes a display control section 170, an operation receiving section 130, an object storage section 140, a selection process section 150, and a storage section 160. Further, a display device 110 such as a liquid crystal display is connected to the display control section 170 of the selection system 100.

The display control section 170 displays various images on a display screen of the display device 110. More specifically, the display control section 170 displays an icon of an object to be processed, a pointer, a cursor, or the like thereon.

The operation receiving section 130 acquires information of an operation performed by a user with the use of an input device such as a pointing device or the like. A content of the operation to be acquired is movement information of a mouse, movement information of a keyboard cursor, movement information of a finger, a stylus, or a pointer which movement information is obtainable from a touch panel, an operation to instruct selection of an object, or the like.

The object storage section 140 determines an operation content received by the operation receiving section 130. More specifically, the object storage section 140 determines whether or not the pointer or the cursor moves and then stops while pointing any object, based on predetermined criteria. If the pointer is determined to stop, an object pointed by the pointer is stored in the storage section 160 as a temporarily selected object. If the operation content from the operation receiving section 130 indicates a selection operation, the selection process section 150 performs processing.

The storage section 160 temporarily stores the temporarily selected object therein. A hard disk drive or the like is also usable as the storage section 160, but preferably, a memory region which enables high-speed access is convenient. A common memory region provided by an operating system may be also usable as the memory region.

When the operation content received by the operation receiving section 130 indicates an object selection operation (a clicking operation by the mouse, a decision operation by the keyboard, a touch operation on the touch panel, or the like), the selection process section 150 determines whether an appropriate object is selected or not. The determination on whether the selection is appropriate or not is performed such that a current object pointed by the pointer is acquired and then compared with the temporarily selected object stored in the object storage section 140. If they are the same object, it is determined that the selection is an appropriate selection operation. Then, an object selection process is finally performed. More specifically, a function assigned to the object is performed by a CPU.

Figure 2:
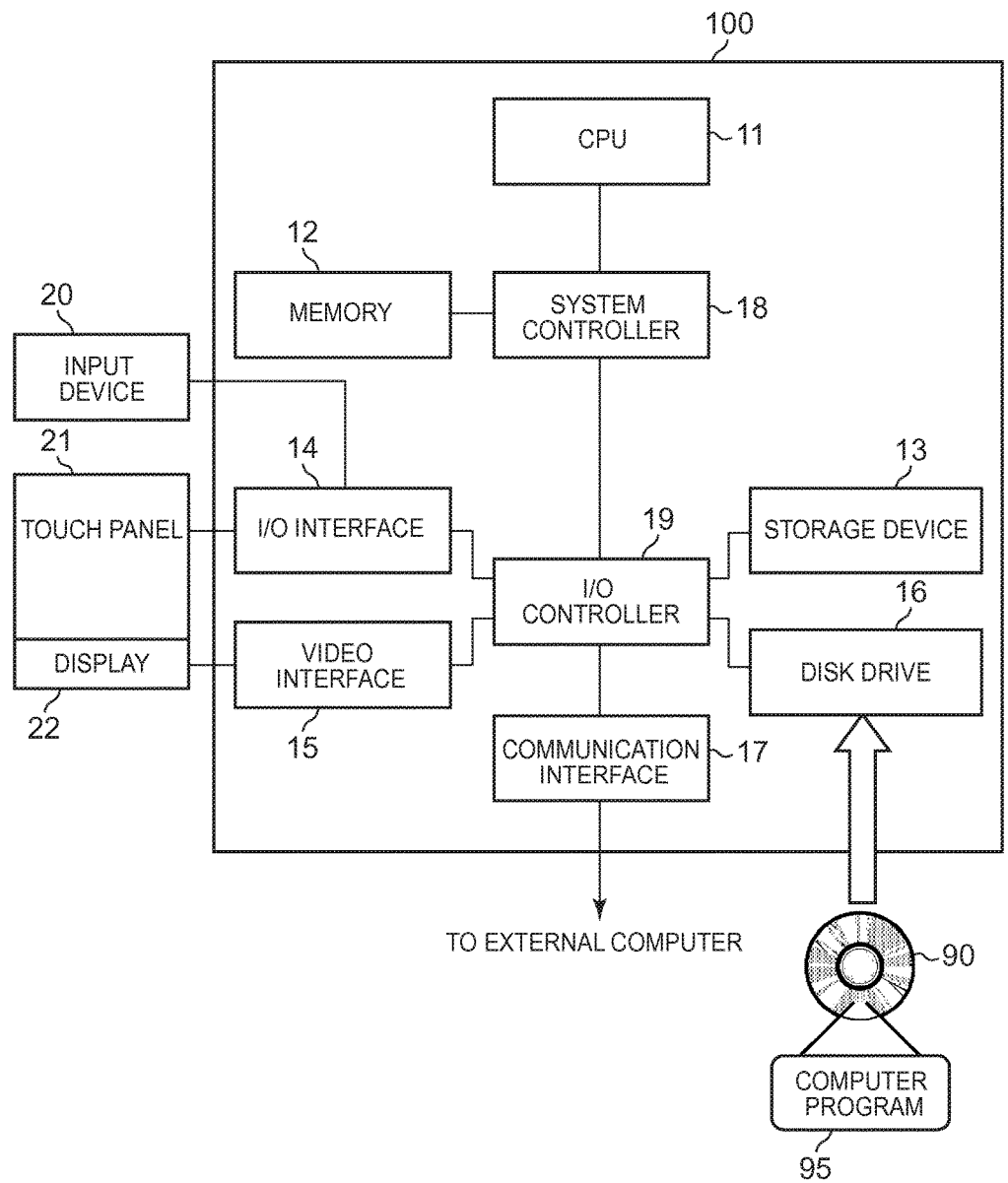
FIG. 2 is an exemplary hardware configuration of a computer suitable for constituting the selection system according to an exemplary embodiment.

FIG. 2 is a view illustrating an exemplary hardware configuration of a computer suitable for constituting the selection system 100 according to an exemplary embodiment. The system 100 is constituted by at least a CPU (a central processing unit) 11, a memory 12, a storage device 13, an I/O interface 14, a video interface 15, a disc drive 16, a communication interface 17, and an internal bus for connecting the aforementioned hardware.

The memory 12 is connected to the CPU 11 via a system controller 18. Further, the communication interface 17 and the disc drive 16 are connected to the system controller 18 via an I/O controller 19. Each constituent may be connected via a different bus according to a communication speed. The memory 12 is used to store object information. For example, a memory region (referred to as a clipboard) provided by the OS to be shared between applications may be used as the storage section 160.

The CPU 11 controls an operation of each section in the hardware of the system 100 via the internal bus, reads a computer program including the OS which computer program is stored in the storage device 13, and performs various software functions. A load module for execution of the computer program including the OS is unfolded in the memory 12, so that temporary data or the like for execution of the computer program is stored therein.

A computer program and data 95 stored in a portable recording medium such as a DVD, a CD-ROM, or the like are read through the disc drive 16 and unfolded in the storage device 13 or the memory 12, so that the computer program and data 95 are performed by the CPU 11.

The communication interface 17 is connected to the internal bus so as to be connected to external networks such as the Internet, LAN, WAN, and the like, thereby allowing data transmission and reception with an external device. It is needless to say that a program may be received and executed via the communication interface 17. The I/O interface 14 is connected to a touch panel 21 as well as an input device 20 such as a keyboard, a mouse, or the like, and receives data input. It should be noted that the touch panel is not indispensable to implementation of an exemplary embodiment. In the example of FIG. 2, the video interface 15 is connected to a display 22 integrated with the touch panel 21 so as to display images of an icon of an object and the pointer.

Typical hardware examples used for the system 100 of FIG. 2 include a smartphone, a mobile phone, a personal computer, and the like. It is needless to say that the system is feasible even by hardware based on an OS for the touch panel.

Figure 3:
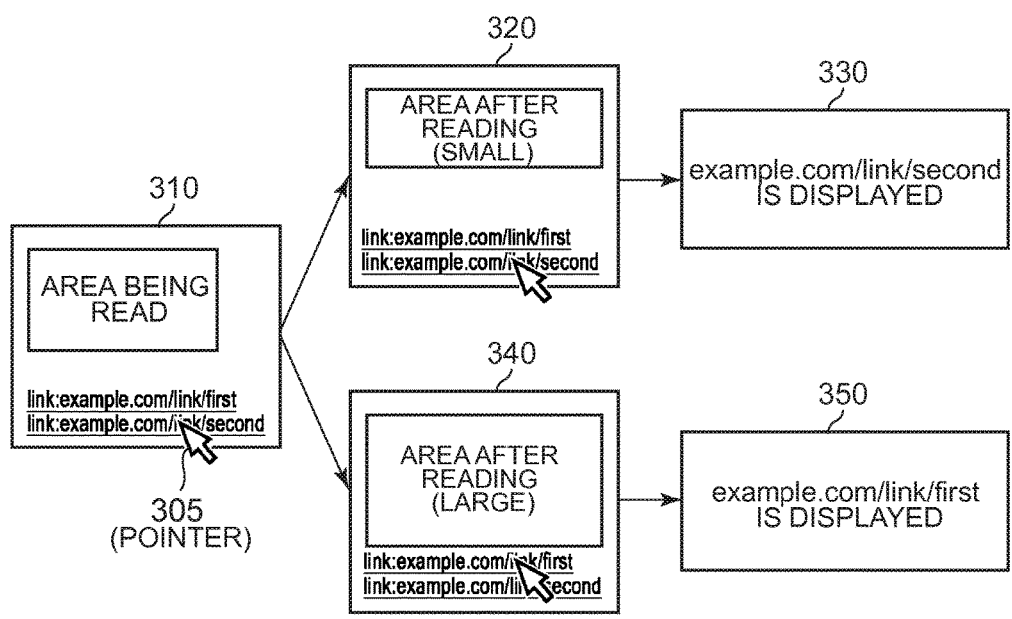
FIG. 3 is an example of a conventional wrong link selection.

FIG. 3 is an example of a conventional wrong link selection. A user moves a pointer 305 to a desired link (example.com/link/second) during reading of a WEB page. At this time, there exists an area being read, in addition to URL information, on a display region 310. Here, two examples after the reading of this area is finished are shown as a display region 320 and a display region 340. The user performs an operation to select the link (more specifically, clicking of a mouse, press of a decision key of a keyboard, a touch operation on a touch panel, or the like).

Initially, the display region 320 exemplifies a case where expansion of the area after the reading is small. In this case, the user selects the desired link (example.com/link/second) appropriately, so that a WEB page 330 of example.com/link/second, which is a link destination, is displayed.

Next, the display region 340 exemplifies a case where expansion of the area after the reading is large. In this case, since a position of the link is moved at the time when the user performs the selection operation, the user cannot select the desired link (example.com/link/second) appropriately, and a WEB page 350 of example.com/link/first, which is a wrong link destination, is displayed.

Figure 4:
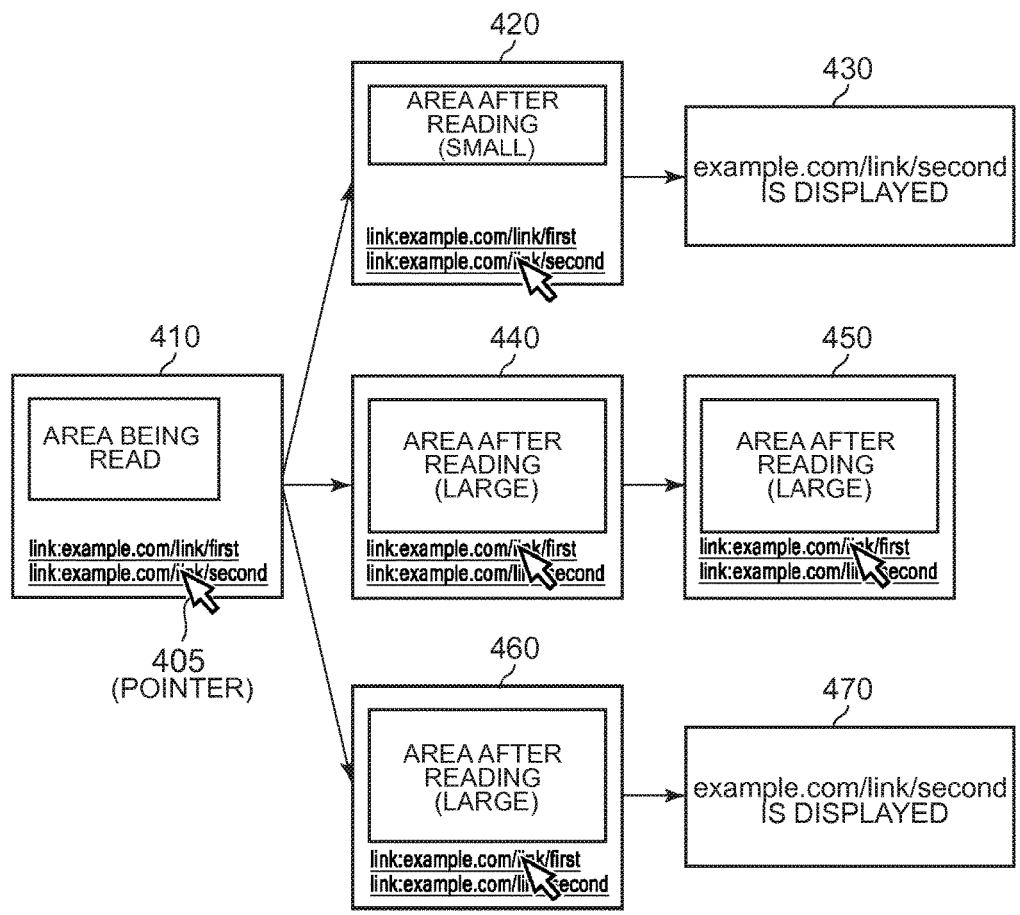
FIG. 4 is an example of a link selection according to an exemplary embodiment.

FIG. 4 is an example of a link selection according to an exemplary embodiment. Initially, a user moves a pointer 405 to a desired link (example.com/link/second) during reading of a WEB page. At this time, there exists an area being read, as well as URL information, on a display region 410. Here, three examples after the reading of this area is finished are shown as a display region 420, a display region 440, and a display region 460. The user performs an operation to select a link (more specifically, clicking of a mouse, press of a decision key of a keyboard, a touch operation on a touch panel, or the like).

The display region 420, which is the first example, exemplifies a case where expansion of the area after the reading is small. In this case, the user selects a desired link (example.com/link/second) appropriately, so that a WEB page 430 of example.com/link/second, which is a link destination, is displayed.

The display region 440, which is the second example, exemplifies a case where expansion of the area after the reading is large. In this case, since a position of a link is moved at the time when the user performs a selection operation, the user selects not a desired link (example.com/link/second), but a wrong link (example.com/link/first). However, the selection operation is canceled according to a special operation form of an exemplary embodiment, and the display region 450 does not change while keeping the same content as the display region 440.

The above form has the following effect. That is, an object (link information "example.com/link/second" in the above example) pointed by the pointer before the user operates the pointer to select the link is stored as a temporarily selected object. At a stage where the user finally performs a selection operation, an object pointed by the pointer is compared with the temporarily selected object thus stored, so as to determine whether or not the object thus pointed is identical with the temporarily selected object. If they are different from each other, the selection operation is canceled.

The display region 460, which is the third example, exemplifies another case where expansion of the area after the reading is large. In this case, since a position of a link is moved at the time when the user performs a selection operation, the user selects not a desired link (example.com/link/second), but a wrong link (example.com/link/first). However, the desired link (example.com/link/second) for the user is selected according to a special operation form of an exemplary embodiment, and a WEB page 470, which is an appropriate link destination, is displayed.

In the above form, an object (link information "example.com/link/second" in the above example) pointed by the pointer before the user operates the pointer to select the link is stored as a temporarily selected object. At a stage where the user finally performs a selection operation, an object pointed by the pointer is compared with the temporarily selected object thus stored, so as to determine whether or not the object thus pointed is identical with the temporarily selected object. If they are different from each other, the temporarily selected object is considered to be selected.

Figure 5:
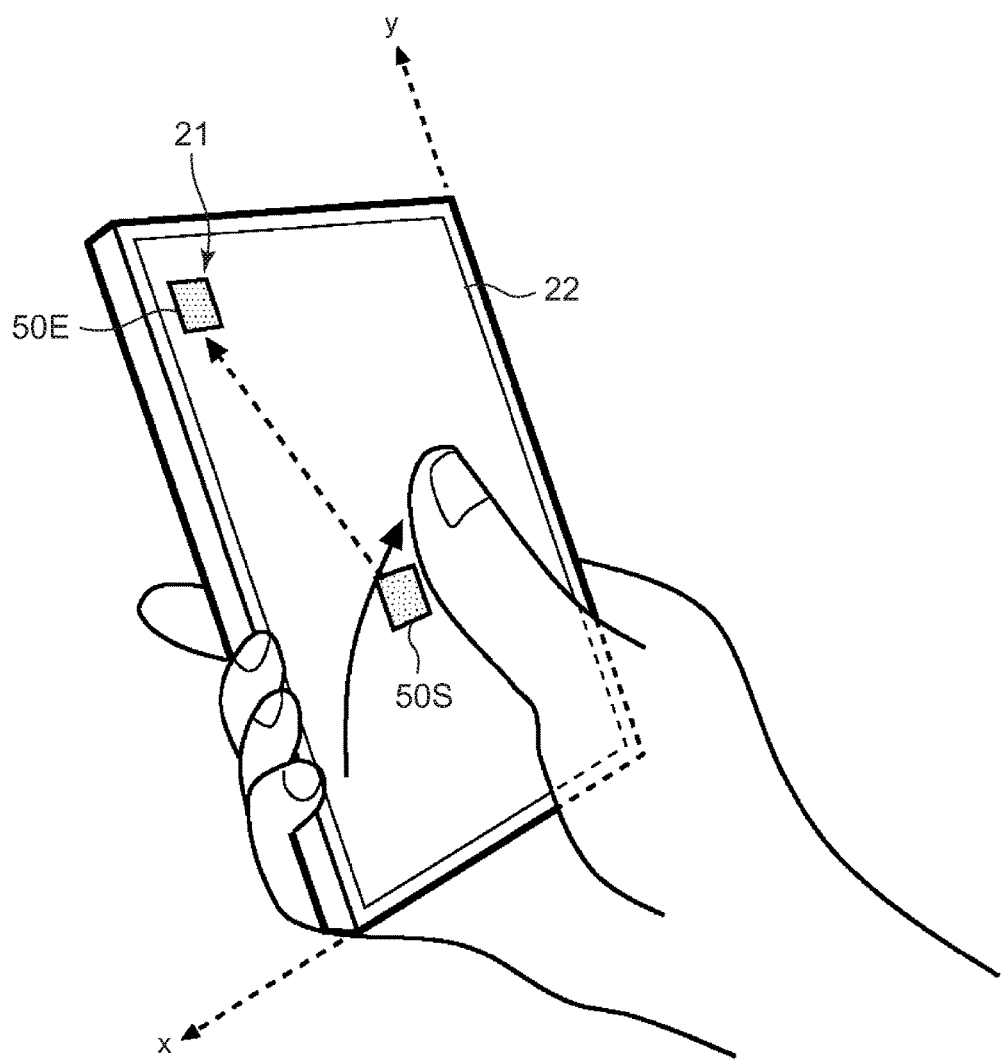
FIG. 5 is an example of an object selection on a touch panel according to an exemplary embodiment.

FIG. 5 is an example of an icon object selection on the touch panel 21 according to an exemplary embodiment. A system 100 in FIG. 5 is assumed as a smartphone, a mobile phone, or hardware based on an OS for a touch panel. Initially, a user moves his/her thumb to select a desired icon object 50S. However, the icon object is being redrawn or is reset on a display 22, so that a position of the icon object 50S is changed and the icon object 50S is moved to a position 50E. Further, there is such a possibility that another object may be placed on an area where the icon object 50S was placed.

In a conventional method, it is difficult to select the icon object 50S appropriately in this state. Further, a different object may be selected wrongly. However, according to a special method of an exemplary embodiment, a wrong object is not selected.

The above form has the following effect. That is, an icon object which the user is going to select is stored as a temporarily selected icon object before the user moves his/her thumb to select the icon object, and at a stage where the user finally performs a selection operation (the user touches the icon, for example), a selected icon object is compared with the temporarily selected icon object thus stored, so as to determine whether or not the selected icon object is identical with the temporarily selected icon object. If they are different from each other, the selection operation is canceled.

Further, as another form, a selected icon object is compared with a stored icon object so as to determine whether or not they are identical with each other, and if they are different from each other, it may be determined, with the use of the stored icon object, that the icon object 50S (that is, 50E at the time of selection) in the above example is selected.

FIG. 6 illustrates an example of a menu object selection on the touch panel 21 according to an exemplary embodiment. A system 100 in FIG. 6 is assumed as a smartphone, a mobile phone, or hardware based on an OS for a touch panel. Initially, a user moves his/her thumb to select a desired menu object 60S. However, the menu object is being redrawn or is reset on a display 22, so that a position of the menu object 60S is changed and the menu object 60S is moved to a position 60E. Further, there is such a possibility that another object may be placed on an area where the menu object 60S was placed.

In a conventional method, it is difficult to select the menu object 60S appropriately in this state. Further, there may be such a possibility that a different object is selected wrongly. However, according to a special method of an exemplary embodiment, a wrong menu object is not selected.

The above form has the following effect. That is, a menu object which the user is going to select is stored as a temporarily selected menu object before the user moves his/her thumb to select the menu object, and at a stage where the user finally performs a selection operation (the user touches the menu, for example), a selected menu object is compared with the temporarily selected menu object thus stored, so as to determine whether or not the selected menu object is identical with the temporarily selected menu object. If they are different from each other, the selection operation is canceled.

Further, as another form, a selected menu object is compared with a stored menu object so as to determine whether or not they are identical with each other, and if they are different from each other, it may be determined, with the use of the stored menu object, that the menu object 60S (that is, 60E) in the above example is selected.

FIG. 7 illustrates a determination method of a temporary selection and a selection according to an exemplary embodiment. A column header indicates movement and selection mechanisms, and a row header indicates types of selection. Initially, in a case of a mouse, a determination on a temporary selection is performed as follows: When a moving speed of a pointer is not more than a predetermined speed (e.g., 1 dot/sec), it is determined that the pointer stops. If there is an object at which the pointer is positioned (an object pointed by the pointer), the object is stored in the storage section 160 as a temporarily selected object. The selection is performed by pressing a button of the mouse (press of a left button) or pressing a decision key of a keyboard.

In a case of a capacitive sensing touch panel, it is possible to measure a distance between a finger (a stylus) and the panel. In view of this, a determination on a temporary selection is performed as follows: When the finger (the stylus) is placed at almost the same position without touching a screen over a predetermined period of time (e.g., 100 msec), it is determined that the finger (the stylus) stops. If there is an object at which the finger is positioned (an object pointed by the finger), the object is stored in the storage section 160 as a temporarily selected object. When the finger (the stylus) touches a display screen 22 or when the finger (the stylus) is removed from the display screen 22 by a predetermined distance, it is determined that the object is selected.

In a case of other touch panels, a determination on a temporary selection is performed as follows: When the finger (the stylus) touches the same position on a display screen over a predetermined period of time, it is determined that the finger (the stylus) stops. If there is an object at which the finger is positioned (an object pointed by the finger), the object is stored in the storage section 160 as a temporarily selected object. When the finger (the stylus) is removed from the display screen 22, it is determined that the object is selected. In addition to the above, various conditions can be set according to a selection mechanism.

Figure 8:
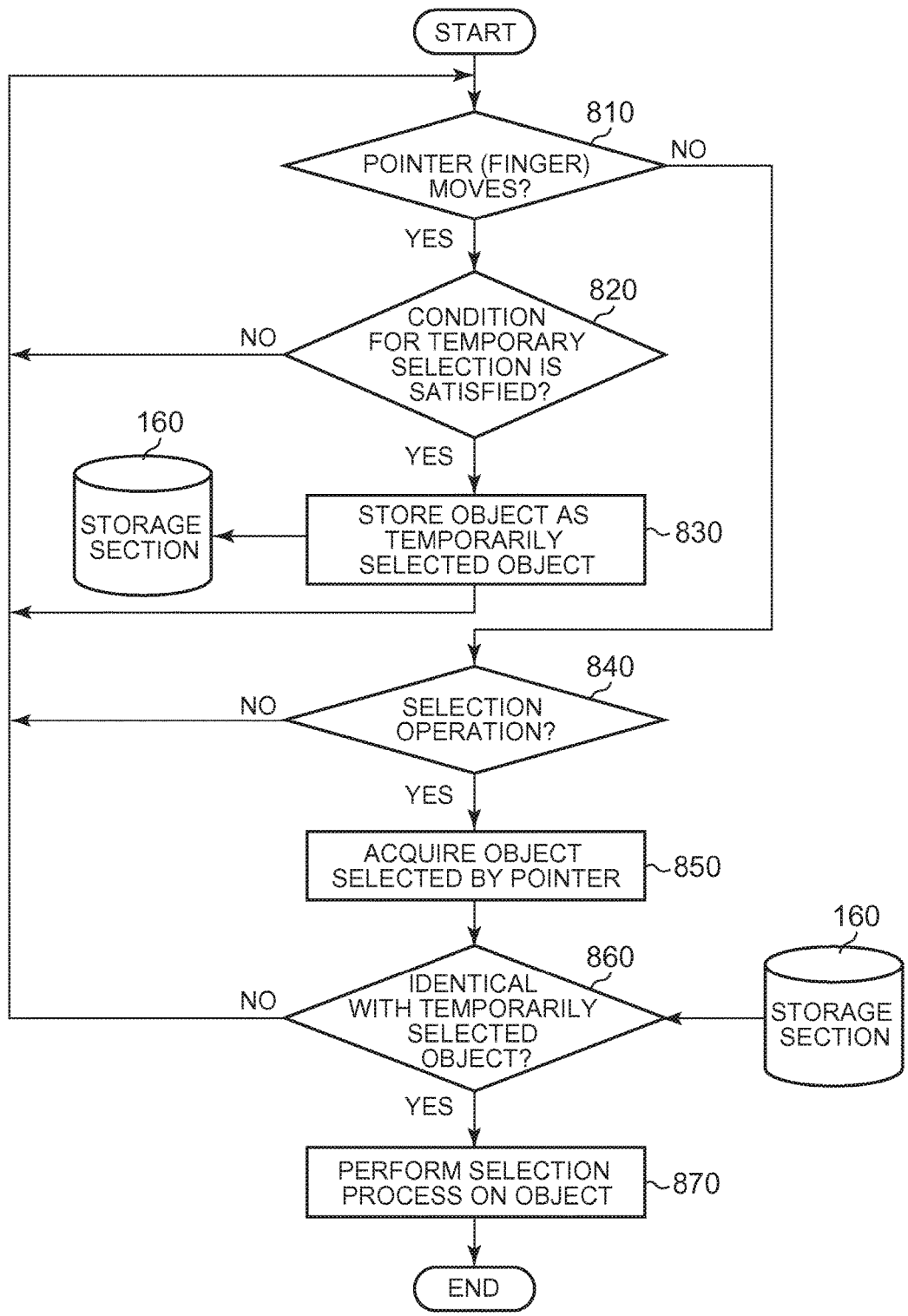
FIG. 8 is a flowchart illustrating a process flow according to an exemplary embodiment.

FIG. 8 is a flowchart illustrating a process flow in an object selection operation according to an exemplary embodiment. It is assumed that, at a process start, the system 100 is able to accept a movement of the pointer and a selection operation. Further, a plurality of applications may be under drawing processing. Initially, in block 810, it is determined whether or not the pointer or the finger moves. When the pointer or the finger moves, it is determined, in block 820, whether or not the pointer stops (whether or not a condition for a temporary selection of an object is satisfied), so as to determine where the pointer stops.

If the condition for the temporary selection is satisfied, the process proceeds to block 830 to store the object in the storage section 160 as a temporarily selected object, and returns to block 810. If the pointer does not move in block 810, it is determined, in block 840, whether or not a selection operation is performed.

When the selection operation is performed, information of an object pointed by the pointer is acquired in block 850. Then, in block 860, this information is compared with information of the temporarily selected object stored previously. If they are identical with each other as a result of the comparison, a final selection process is performed on the object in block 870. That is, a function assigned to the object is performed.

If the comparison fails in block 860, the process returns to block 810 without performing the final selection process. That is, the display screen 22 does not change. This flow of the process provides a very favorable embodiment in that if an object at a moment when the user stops the pointer is different from an object at a moment when the user clicks, the user may select a wrong object.

Figure 9:
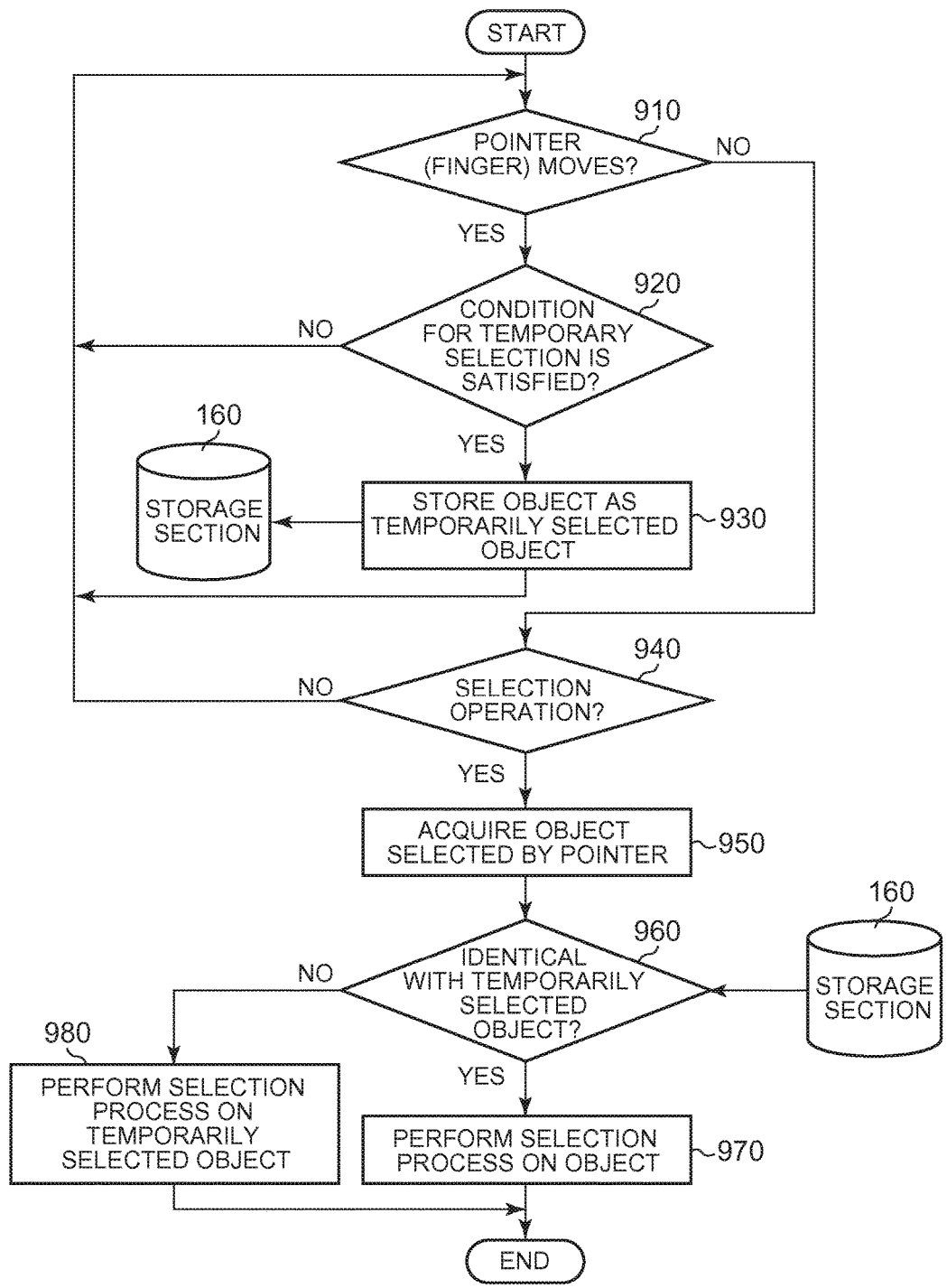
FIG. 9 is a flowchart illustrating another process flow according to an exemplary embodiment.

FIG. 9 is a flowchart illustrating another process flow in an object selection operation according to an exemplary embodiment. It is assumed that, at a process start, the system 100 is able to accept a movement of the pointer and a selection operation. Further, a plurality of applications may be under drawing processing. Initially, in block 910, it is determined whether or not the pointer or the finger moves. If the pointer or the finger moves, it is determined, in block 920, whether or not the pointer stops (whether or not a condition for a temporary selection of an object is satisfied), so as to determine where the pointer stops.

If the condition for the temporary selection is satisfied, the process proceeds to block 930 to store the object in the storage section 160 as a temporarily selected object, and returns to block 910. If the pointer does not move in block 910, it is determined, in block 940, whether or not a selection operation is performed.

When the selection operation is performed, information of an object pointed by the pointer is acquired in block 950. Then, in block 960, this information is compared with information of the temporarily selected object stored previously. If they are identical with each other as a result of the comparison, a final selection process is performed on the object in block 970. That is, a function assigned to the object is performed.

If the comparison fails in block 960, a selection process is performed on the temporarily selected object in block 980. This process provides a very favorable embodiment in that an object at a moment when the user stops the pointer is assumed as an object desired by the user.

Figure 10:
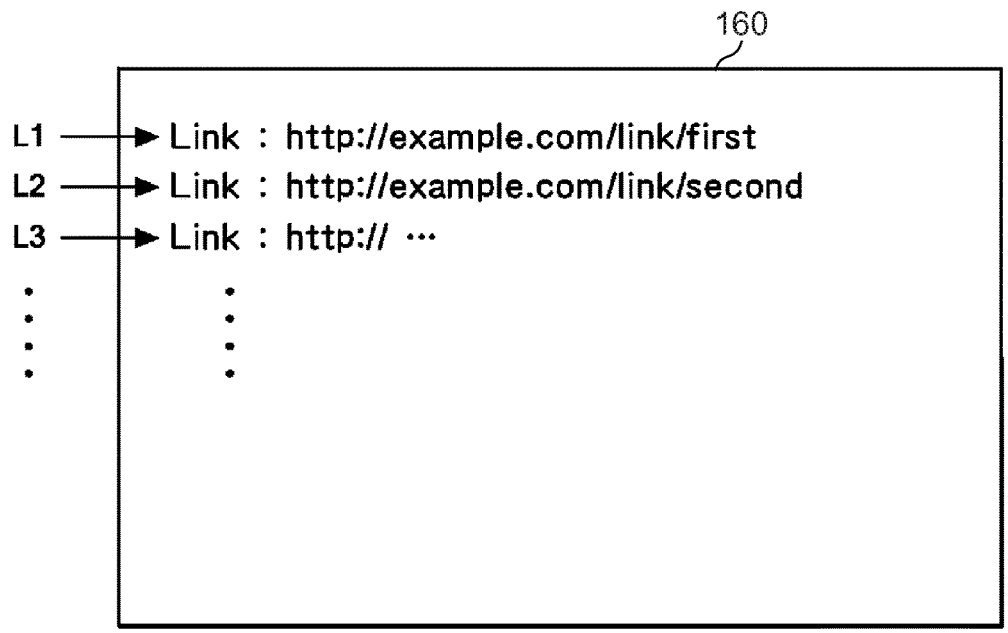
FIG. 10 is an exemplary recorded content of a temporarily selected object according to an exemplary embodiment.
Figure 11:
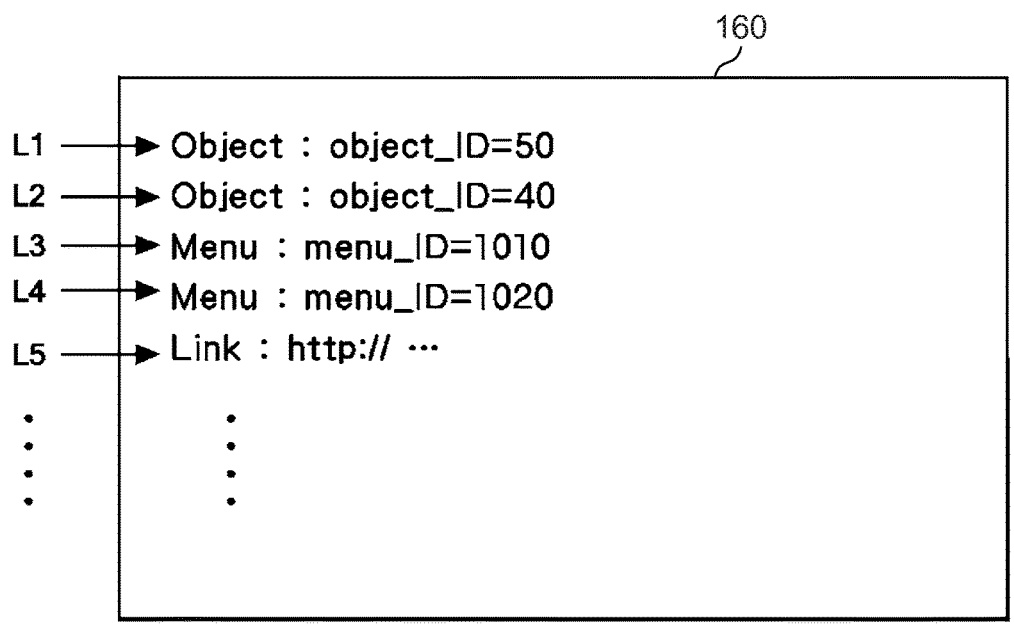
FIG. 11 is an exemplary recorded content of a temporarily selected object according to an exemplary embodiment.

A recorded content of the temporarily selected object according to an exemplary embodiment is described in FIGS. 10 and 11. It is preferable that the temporarily selected object be stored in a memory region which enables high-speed access. FIGS. 10 and 11 illustrate examples in which a common memory region (also referred to as a clipboard) provided by an operating system is used as the memory region.

Basically, only one temporarily selected object should be stored for one type of an object. The following description deals with a case where a plurality of temporarily selected objects is stored. A latest object is added to a newest line in the common memory region. An object is recorded in one line including a type of the object and a content of the object.

In the example of FIG. 10, "Link:" indicative of link information and link destination information thereof are recorded in pair.

The following describes FIG. 10 sequentially from the bottom to the up. Initially, at a stage where it is determined that the pointer stops after moving, temporarily selected objects are stored sequentially in L3 (the third line), in L2 (the second line) as example.com/link/second, and in L1 (the first line) as example.com/link/first. In this state, in a case where an object on which the user performs a selection operation is example.com/link/second, the object is different from a temporarily selected object (example.com/link/first) which is stored latest. Accordingly, the selection operation is canceled.

FIG. 11 illustrates a state where a plurality of types of objects is mixed on a touch panel or the like and recorded as temporarily selected objects. At a stage where it is determined that the pointer stops after moving, temporarily selected objects are stored in the storage section 160 sequentially as L5: link information, L4: menu object ID=1020, L3: menu object ID=1010, L2: object information ID=40, and L1: object information ID=50. Here, in a case where object information of an object on which a user performs a selection operation is ID=50, the object is identical with the temporarily selected object which is stored, and thus, the selection operation on the object is valid and a function assigned to the object is performed.

As in the example in FIG. 11, different types of objects may be mixed as the object information in the common memory region. Further, in the above two examples, information of the temporarily selected object is recorded as text information, but a binary image of the object itself such as an icon object or a program may be recorded.

Further, in a case where the temporarily selected object is different from the object on which the selection operation is performed, a dialog may be displayed to show a content of the common memory region to the user, so that the user selects an object from a list of temporarily selected objects which are stored previously. An exemplary embodiment is not limited to the above embodiments, and it is possible to make various modifications within the gist of an exemplary embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for selecting an object displayed on a display device of a computer including the display device and a storage device, the method comprising:
   moving a movable pointer in the display device in response to an input of a user;
   determining whether the pointer is in a predetermined temporary selection state;
   based on a determination that the pointer is in the temporary selection state, acquiring an object pointed to by the pointer;
   storing the object in the storage device as a temporarily selected object;
   moving, by a processor of the computer, of the temporarily selected object from a first position on the display device to a second position on the display device;
   moving, by the processor of the computer, of a second object on the display device to the first position on the display device;
   acquiring the second object pointed to by the pointer in response to the user performing a predetermined object selection operation;

comparing the second object with the temporarily selected object;

based on a determination that the second object is identical to the temporarily selected object, determining that the second object is selected; and determining that the temporarily selected object is selected, when the second object is not identical with the temporarily selected object as a result of the comparison.

2. The method according to claim 1, wherein the determination on the predetermined temporary selection state is performed such that when a moving speed of the pointer is not more than a predetermined speed, the pointer is determined to be in the temporary selection state.

3. The method according to claim 1, wherein the determination on the predetermined temporary selection state is performed such that when the pointer stops over a predetermined period of time, the pointer is determined to be in the temporary selection state.

4. The method according to claim 1, further comprising canceling the object selection operation when the second object is not identical with the temporarily selected object as a result of the comparison.

5. The method according to claim 1, wherein the second object is a URL, an icon object, or a menu object.

6. The method according to claim 1, wherein the display device has a touch panel function, and the pointer is a finger of the user or a stylus which the user uses.

7. An object selection device for selecting an object displayed on a display device of a computer including the display device, a storage device, and a processor configured to:

move a movable pointer in the display device in response to an input of a user;

determine whether the pointer is in a predetermined temporary selection state;

based on a determination that the pointer is in the temporary selection state, acquire an object pointed to by the pointer store the object in the storage device as a temporarily selected object;

move, by a processor of the computer, of the temporarily selected object from a first position on the display device to a second position on the display device;

move, by the processor of the computer, of a second object on the display device to the first position on the display device;

acquire the second object pointed to by the pointer in response to the user performing a predetermined object selection operation;

compare the second object with the temporarily selected object;

based on a determination that the second object is identical to the temporarily selected object, determine that the second object is selected; and determine that the temporarily selected object is selected, when the second object is not identical with the temporarily selected object as a result of the comparison.

8. The device according to claim 7, wherein the determination on the predetermined temporary selection state is performed such that when a moving speed of the pointer is not more than a predetermined speed, the pointer is determined to be in the temporary selection state.

9. The device according to claim 7, wherein the determination on the predetermined temporary selection state is performed such that when the pointer stops over a predetermined period of time, the pointer is determined to be in the temporary selection state.

10. The device according to claim 7, wherein the processor is further configured to cancel the object selection operation when the second object is not identical with the temporarily selected object as a result of the comparison.

11. The device according to claim 7, wherein the second object is a URL, an icon object, or a menu object.

12. The device according to claim 7, wherein the display device has a touch panel function, and the pointer is a finger of the user or a stylus which the user uses.

13. A computer program product for creating a classification rule by combining classifiers, the computer program product comprising a computer readable storage device having program code embodied therewith, the program code executable by a processor to:

move a movable pointer in a display device in response to an input of a user;

determine whether the pointer is in a predetermined temporary selection state;

based on a determination that the pointer is in the temporary selection state, acquire an object pointed to by the pointer;

move, by the processor, of the temporarily selected object from a first position on the display device to a second position on the display device;

move, by the processor, of a second object on the display device to the first position on the display device;

store the object in the storage device as a temporarily selected object;

acquire a second object pointed to by the pointer in response to the user performing a predetermined object selection operation;

compare the second object with the temporarily selected object;

based on a determination that the second object is identical to the temporarily selected object, determine that the second object is selected; and determine that the temporarily selected object is selected, when the second object is not identical with the temporarily selected object as a result of the comparison.

14. The computer program product according to claim 13, wherein the determination on the predetermined temporary selection state is performed such that when a moving speed of the pointer is not more than a predetermined speed, the pointer is determined to be in the temporary selection state.

15. The computer program product according to claim 13, wherein the determination on the predetermined temporary selection state is performed such that when the pointer stops over a predetermined period of time, the pointer is determined to be in the temporary selection state.

16. The computer program product according to claim 13, wherein the processor is further configured to cancel the object selection operation when the second object is not identical with the temporarily selected object as a result of the comparison.

17. The computer program product according to claim 3, wherein the second object is a URL, an icon object, or a menu object.

* * * * *